(12) United States Patent
Mori et al.

(10) Patent No.: US 11,162,849 B2
(45) Date of Patent: Nov. 2, 2021

(54) TEMPERATURE DETECTING ELEMENT AND TEMPERATURE DETECTING APPARATUS INCLUDING THE SAME

(71) Applicant: Hitachi, Ltd., Tokyo (JP)

(72) Inventors: Shunsuke Mori, Tokyo (JP); Kohhei Aida, Tokyo (JP); Masahiro Kawasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 309 days.

(21) Appl. No.: 16/470,627

(22) PCT Filed: Nov. 20, 2017

(86) PCT No.: PCT/JP2017/041620
§ 371 (c)(1),
(2) Date: Jun. 18, 2019

(87) PCT Pub. No.: WO2018/116720
PCT Pub. Date: Jun. 28, 2018

(65) Prior Publication Data
US 2019/0323901 A1 Oct. 24, 2019

(30) Foreign Application Priority Data

Dec. 22, 2016 (JP) .............................. JP2016-248552

(51) Int. Cl.
*G01K 11/12* (2021.01)
*G01K 7/22* (2006.01)
(Continued)

(52) U.S. Cl.
CPC ............... *G01K 11/12* (2013.01); *G01K 3/10* (2013.01); *G01K 7/22* (2013.01); *G01K 11/06* (2013.01)

(58) Field of Classification Search
CPC . G01K 11/12; G01K 3/10; G01K 7/22; G01K 11/06; G01K 11/16; G01K 11/14; G01K 11/18
See application file for complete search history.

(56) References Cited

U.S. PATENT DOCUMENTS 4,169,661 A * 10/1979 Yamada ................ G02F 1/0147
359/289
4,931,420 A * 6/1990 Asano ....................... G01K 3/04
503/205
(Continued)

FOREIGN PATENT DOCUMENTS

JP          5-52667 A      3/1993
JP       2009-126954 A     6/2009
(Continued)

OTHER PUBLICATIONS

English Machine Translation of JPH0552667A to Kanayama et al. (Year: 1993).*

(Continued)

*Primary Examiner* — Nathaniel T Woodward
*Assistant Examiner* — Philip L Cotey
(74) *Attorney, Agent, or Firm* — Crowell & Moring LLP

(57) ABSTRACT

The present invention is directed to a temperature detecting element including base materials provided with substrates and electrodes arranged on the substrates, and a temperature detector arranged to electrically contact the electrodes on the substrates, in which a change in an electromagnetic wave absorbing property (light-absorbing property) and a change in an electrical property (resistance value) corresponding to a temperature change of the temperature detector are reversible. The temperature detecting element is easily stored and (Continued)

managed before use, and a temperature change in a temperature management environment can be accurately detected.

13 Claims, 7 Drawing Sheets

(51) Int. Cl.
*G01K 3/10* (2006.01)
*G01K 11/06* (2006.01)

(56) References Cited

U.S. PATENT DOCUMENTS

| | | | | |
|---|---|---|---|---|
| 5,663,115 A * | 9/1997 | Naito | ............ | B41M 5/305 |
| | | | | 503/201 |
| 6,008,156 A * | 12/1999 | Tanahashi | ............ | B41M 5/3377 |
| | | | | 503/207 |
| 7,618,922 B2 * | 11/2009 | Ogino | ............ | B41M 5/44 |
| | | | | 503/200 |
| 2002/0026002 A1 * | 2/2002 | Tamura | ............ | B41M 5/305 |
| | | | | 524/323 |
| 2004/0186469 A1 * | 9/2004 | Woloszko | ............ | A61B 5/015 |
| | | | | 606/41 |
| 2004/0222780 A1 * | 11/2004 | Yamada | ............ | G01K 3/04 |
| | | | | 324/110 |
| 2010/0154878 A1 * | 6/2010 | Chen | ............ | C23C 14/086 |
| | | | | 136/256 |
| 2011/0012496 A1 * | 1/2011 | Chang | ............ | C09K 9/00 |
| | | | | 313/111 |
| 2012/0027045 A1 * | 2/2012 | Mclellan | ............ | G01K 3/04 |
| | | | | 374/160 |
| 2012/0079980 A1 * | 4/2012 | Taylor | ............ | G01K 11/12 |
| | | | | 116/206 |
| 2013/0014690 A1 * | 1/2013 | Shirase | ............ | C09K 9/02 |
| | | | | 116/207 |
| 2013/0340885 A1 | 12/2013 | Clayton et al. | | |
| 2014/0342390 A1 * | 11/2014 | Tsuji | ............ | G01N 33/52 |
| | | | | 435/29 |
| 2016/0153843 A1 | 6/2016 | Edson et al. | | |

FOREIGN PATENT DOCUMENTS

| | | |
|---|---|---|
| JP | 2012-112798 A | 6/2012 |
| JP | 5395288 B1 | 1/2014 |

OTHER PUBLICATIONS

Extended European Search Report issued in European Application No. 17885405.5 dated Jun. 19, 2020 (seven (7) pages).
International Search Report (PCT/ISA/210) issued in PCT Application No. PCT/JP2017/041620 dated Jan. 23, 2018 with English translation (three (3) pages).
Japanese-language Written Opinion (PCT/ISA/237) issued in PCT Application No. PCT/JP2017/041620 dated Jan. 23, 2018 (three (3) pages).

* cited by examiner

[FIG. 1]
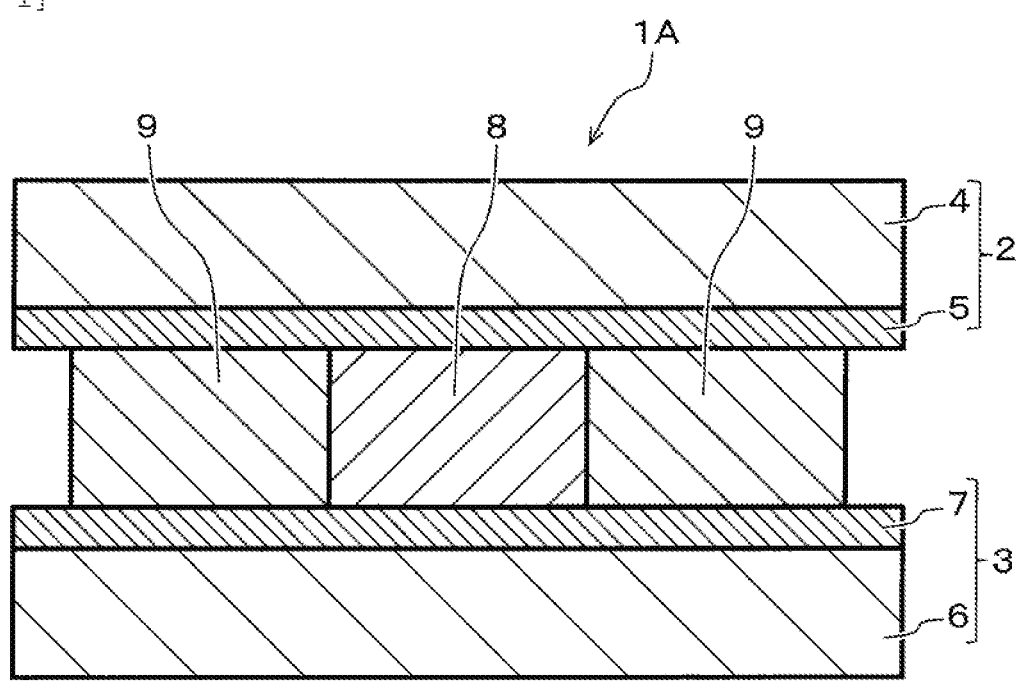

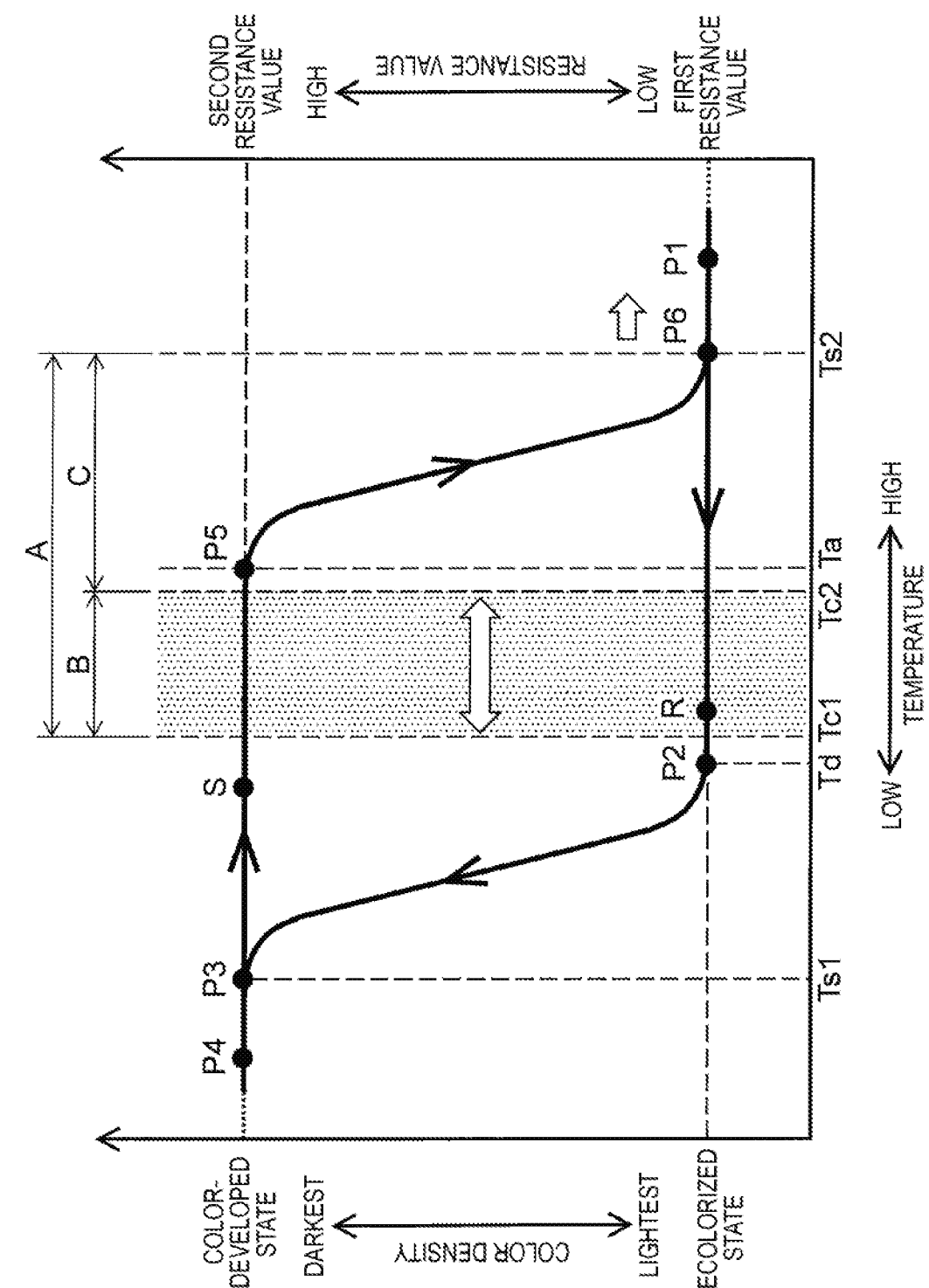
[FIG. 3]

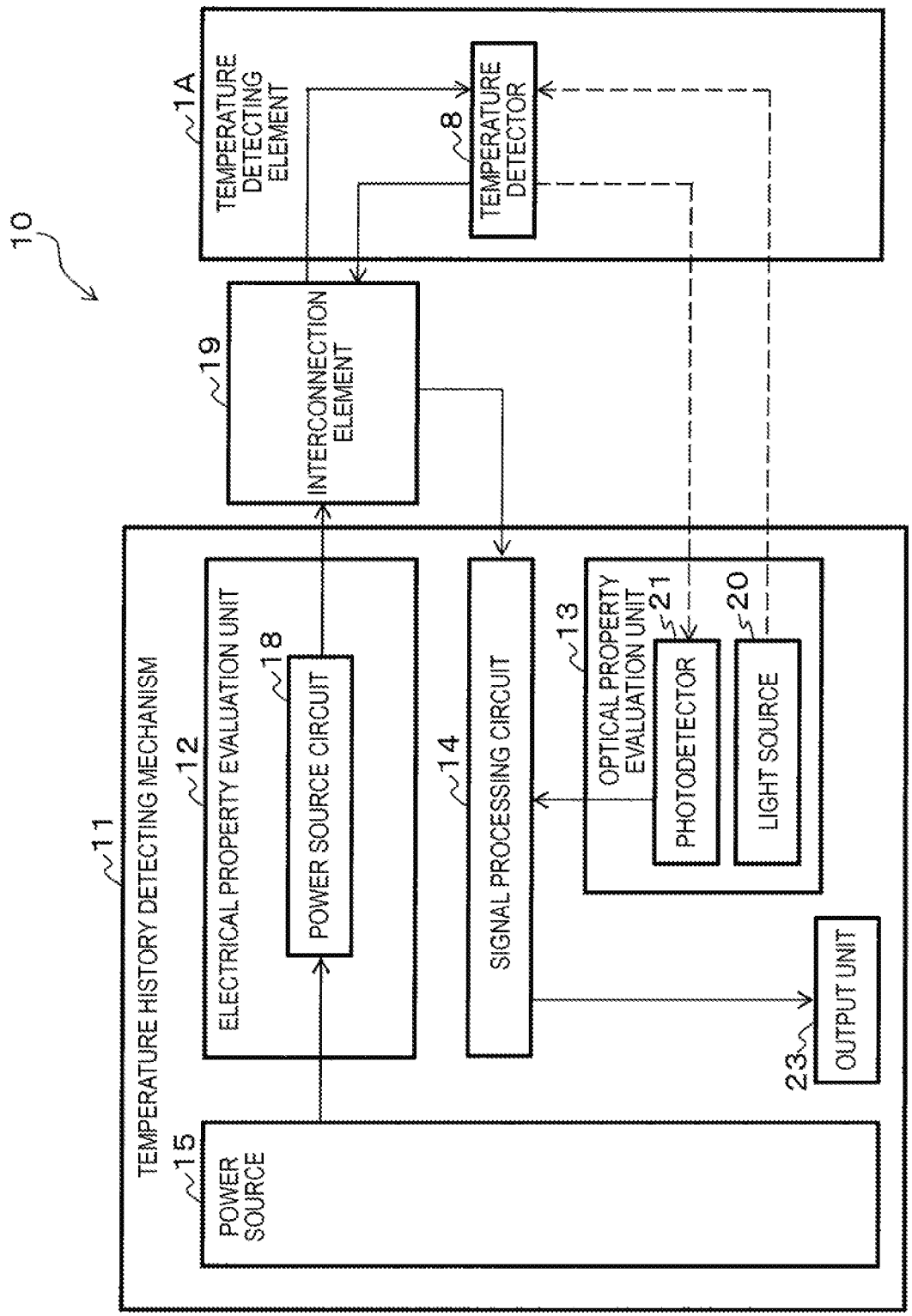
[FIG. 4]

[FIG. 5]
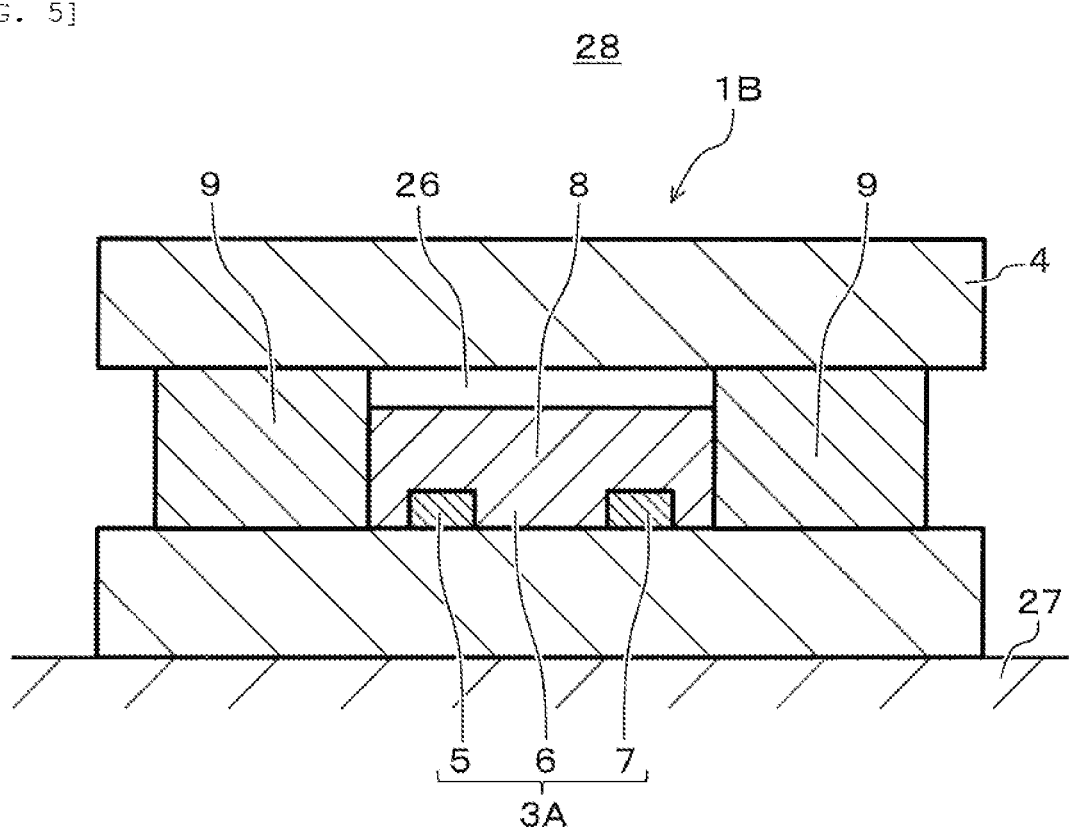

[FIG. 6]
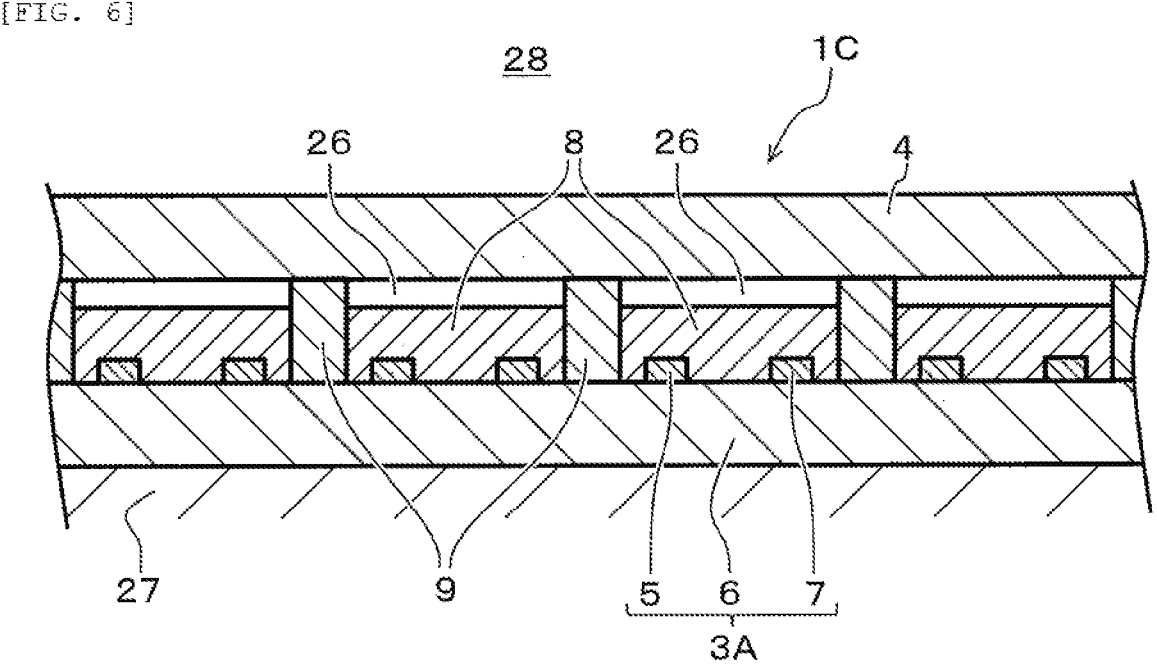

TEMPERATURE DETECTING ELEMENT AND TEMPERATURE DETECTING APPARATUS INCLUDING THE SAME

TECHNICAL FIELD

The present invention relates to a temperature detecting element and a temperature detecting apparatus including the temperature detecting element.

BACKGROUND ART

In the related art, as a temperature management material (temperature detecting element) that detects whether or not a temperature management environment has reached a predetermined temperature, a material having a conductive layer including conductive powder and a temperature sensing layer which is laminated on the conductive layer and includes a non-conductive heat melting material having a melting point corresponding to the predetermined temperature, has been known (for example, see PTL 1). In this temperature management material, when the temperature management environment reaches the predetermined temperature, the heat melting material of the temperature sensing layer melts and infiltrates between the conductive powder particles of the conductive layer. Accordingly, in the temperature management material, electrical resistance of the conductive layer is irreversibly increased due to the infiltrated heat melting material. According to the above temperature management material, it can be detected that the predetermined temperature has been reached by monitoring the electrical resistance of the conductive layer. In addition, the temperature management material includes a pigment in the temperature sensing layer. When the temperature management environment has reached the predetermined temperature, the pigment of the temperature sensing layer is dispersed in the conductive layer together with the melted heat melting material. Accordingly, a color tone of the temperature management material changes. According to the above temperature management material, it can be detected that the predetermined temperature has been reached when the color tone irreversibly changes.

CITATION LIST

Patent Literature

PTL 1: Japanese Patent No. 5395288

SUMMARY OF INVENTION

Technical Problem

The temperature detecting element of the related art (for example, see PTL 1) is used as a means for verifying whether or not low-temperature distribution (cold chain) of such products as frozen food, biopharmaceuticals, electronic components, etc. is properly performed. That is, in the distribution process of a product that needs to be temperature-managed at a temperature equal to or lower than a predetermined temperature, the temperature detecting element is used after being attached to the corresponding product in order to verify whether or not the corresponding product is maintained at the predetermined temperature or lower.

However, since the temperature detecting element of the related art detects whether or not the predetermined temperature has been reached according to the irreversible change as described above, before being used, the temperature detecting element has to be stored under the temperature management sufficiently below the predetermined temperature. Therefore, the temperature detecting element of the related art has a problem of complicating the storage management of the temperature detecting element before use.

In addition, even when the temperature detecting element of the related art is stored under the temperature management below the predetermined temperature, for example, if there is a difference in given temperature history like temperature detecting elements belonging to different lots, a variation in the initial state of the temperature detecting element in use occurs. Therefore, the temperature detecting element of the related art may not accurately detect temperature changes in the temperature management environment.

An object of the present invention is to provide a temperature detecting element which is easily stored and managed before use and is capable of accurately detecting temperature changes in a temperature management environment, and a temperature detecting apparatus including the temperature detecting element.

Solution to Problem

A temperature detecting element according to the present invention that the above object is achieved includes a base material including a substrate and an electrode arranged on the substrate, and a temperature detector arranged to electrically contact the electrode on the substrate, in which a change in an electromagnetic wave absorbing property and a change in an electrical property corresponding to a temperature change of the temperature detector are reversible.

In addition, a temperature detecting apparatus according to the present invention that the above object is achieved includes the temperature detecting element and a temperature history detecting mechanism for detecting a temperature history of the temperature detector in the temperature detecting element.

Advantageous Effects of Invention

According to the present invention, it is possible to provide a temperature detecting element which is easily stored and managed before use and is capable of accurately detecting temperature changes in a temperature management environment, and a temperature detecting apparatus including the temperature detecting element.

BRIEF DESCRIPTION OF DRAWINGS

FIG. 1 is an explanatory diagram showing a configuration of a temperature detecting element according to an embodiment of the present invention.

FIGS. 2C and 2D show statuses in which any of the non-color-developing material and the composition including the leuco dye, the developer, and the decolorizing agent forms a continuous body in the temperature detector in the color-developed state, wherein FIG. 2C is a schematic diagram illustrating the color-developed state and FIG. 2D is a schematic diagram illustrating a decolorized state.

FIG. 3 is a graph showing a relationship between a temperature of the temperature detector and a change in a color density and in a resistance value of the temperature detector in the temperature detecting element.

FIG. 4 is an explanatory diagram showing a configuration of a temperature detecting apparatus including the temperature detecting element according to the embodiment of the present invention.

FIG. 5 is an explanatory diagram showing a configuration of a temperature detecting element according to a first modified example.

FIG. 6 is an explanatory diagram showing a configuration of, a temperature detecting element according to a second modified example.

DESCRIPTION OF EMBODIMENTS

Figure 2A:
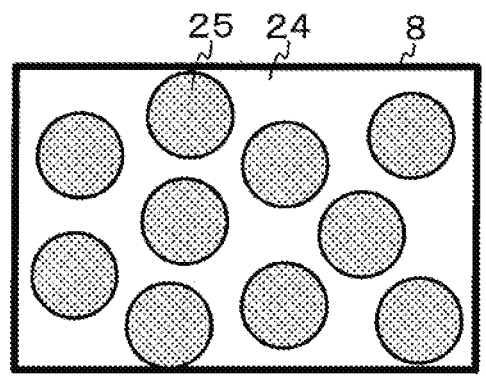
FIG. 2A is a schematic diagram showing a status in which a non-color-developing material retains a composition including a leuco dye, a developer, and a decolorizing agent in a temperature detector in a color-developed state.
Figure 2B:
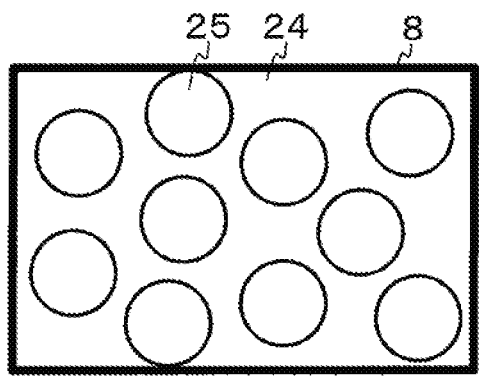
FIG. 2B is a schematic diagram showing a status in which the non-color-developing material retains the composition including the leuco dye, the developer, and the decolorizing agent in the temperature detector in a decolorized state.
Figure 2C:
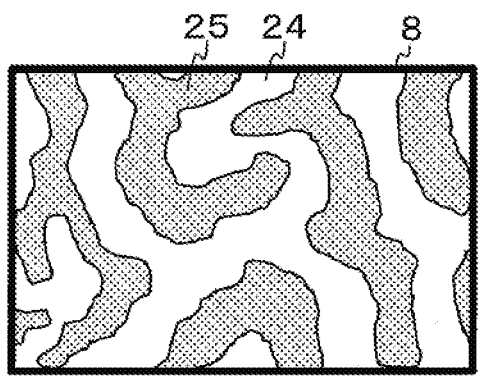
Figure 2D:
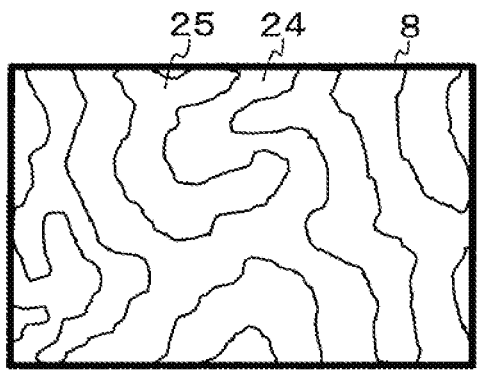

Hereinafter, embodiments of the present invention will be described. A temperature detecting element according to the present embodiment includes a temperature detector having an electromagnetic wave absorbing property such as a light-absorbing property, and an electrical property such as a conductivity and a dielectric property, both of which are reversibly changed, for example, when a temperature management environment reaches a predetermined temperature.

In the present embodiment, the temperature detecting element and a temperature detecting apparatus including the temperature detecting element will be described first, and then, a temperature detecting element according to another embodiment will be described.

(Temperature Detecting Element)

FIG. 1 is an explanatory diagram showing a configuration of a temperature detecting element LA according to the present embodiment.

As shown in FIG. 1, the temperature detecting element LA includes a first base material 2, a second base material 3, a partition wall 9, and a temperature detector 8.

The first base material 2 includes a first substrate 4 and a first electrode 5 arranged on the first substrate 4, and the second base material 3 includes a second substrate 6 and a second electrode 7 arranged on the second substrate 6. The first electrode 5 and the second electrode 7 are arranged respectively on one surface of the first substrate 4 and one surface of the second substrate 6.

The first base material 2 and the second base material 3 are arranged to face each other on a side of the first electrode 5 and a side of the second electrode 7. In addition, the first base material 2 and the second base material 3 interpose the temperature detector 8 therebetween on the side of the first electrode 5 and the side of the second electrode 7. Accordingly, the first electrode 5 and the second electrode 7 configure an electrode pair electrically contacting the temperature detector 8.

The first substrate 4 and the second substrate 6 are formed of an insulating material.

In the temperature detecting element 1A according to the present embodiment, as described above, a change in the light-absorbing property of the temperature detector 8 is detected based on transmitted light or reflected light of the temperature detector 8 via any one of the first substrate 4 and the second substrate 6. That is, at least one of the first substrate 4 and the second substrate 6 of the present embodiment is formed of an insulating material having a light transmitting property.

In detail, when a light detecting method for the temperature detector 8, which will be described below, is based on the transmitted light, both the first substrate 4 and the second substrate 6 are formed of the insulating material having the light transmitting property. In addition, when the light detecting method for the temperature detector 8 is based on the reflected light, any one of the first substrate 4 and the second substrate 6 is formed of the insulating material having the light transmitting property. Even when the light detecting method is based on the reflected light, both the first substrate 4 and the second substrate 6 may be formed of the insulating material having the light transmitting property.

Examples of the insulating material having the light transmitting property used in the first substrate 4 and the second substrate 6 include, but is not limited to, glass; a resin film such as polyethylene terephthalate (PET), polyethylene (PE), polycarbonate (PC), polyesters (PEs), polypropylene (PP), polyvinyl chloride (PVC), and cycloolefin polymer (COP); a paper material such as woodfree paper, kraft paper, and Japanese paper; cellulose nano-fiber; etc.

In addition, the first substrate 4 and the second substrate 6 having the light transmitting property may be colored for correcting a color tone, etc. in a color tone change that will be described below, provided that the light transmitting property can be maintained. In addition, individual information of a product, etc. to which the temperature detecting element 1A is to be attached, character information indicating a predetermined condition such as a management condition, a barcode, a QR code, etc. can be attached to an outer side surface of the first substrate 4 and/or the second substrate 6.

The first electrode 5 and the second electrode 7 of the present embodiment output a change in the conductivity of the temperature detector 8 described above to the outside. In detail, a change in a resistance value of the temperature detector 8 is detected via the first electrode 5 and the second electrode 7, as described later.

It is assumed that the first electrode 5 and the second electrode 7 of the present embodiment are formed over the entire surface of one surface of the first substrate 4 and one surface of the second substrate 6, as described above. However, the first electrode 5 and the second electrode 7 can be partially formed on one surface of the first substrate 4 and one surface of the second substrate 6, respectively. In this case, examples of planar shapes of the first electrode 5 and the second electrode 7 include a circular shape, an ellipse shape, a polygonal shape, an amorphous shape, etc. Also, the planar shapes of the first electrode 5 and the second electrode 7 can be formed as a figure such as a predetermined character, a signal, etc.

The first electrode 5 and the second electrode 7 preferably have low resistance and low loss.

In addition, as described above, the first electrode 5 and/or the second electrode 7 provided on a side on the first substrate and/or the second substrate 6 through which the light is transmitted is preferably light-transmitting electrodes.

Examples of the light-transmitting electrode include, but are not limited to, a metal film of aluminum, chromium, tantalum, titanium, neodymium, molybdenum, copper, silver, etc., an alloy film of these metal, indium zinc oxide (IZO) film, indium tin oxide (ITO) film, a tin oxide film, a zinc oxide film, a carbon nanotube film, a graphene film, etc. These films may each be either a single-layered film or a laminated film.

The light-transmitting electrode may be formed of an ultra-thin wire or mesh, instead of the above film. On surfaces of the electrodes 5 and 7, for example, an oxide including silicon, gallium, aluminum, calcium, magnesium, etc. and a resin film including a functional group, etc. of a non-color-developing material that will be described later can be formed, in order to control detectability of the electrical property of the temperature detector 8, stability, adhesion to the substrates 4 and 6 or the temperature detector 8, wettability to the temperature detector 8, etc. The electrodes 5 and 7 having an improved adhesion due to the oxide are particularly preferable when a flexible substrate is used. In addition, the oxide layer of clay mineral of silicate salt, etc. applied to the electrodes 5 and 7 can function as a barrier layer against the temperature detector 8 suppressing permeability of oxygen and moisture.

In the first base material 2 and the second base material 3 of the present embodiment, it is assumed that heat fluxes toward the temperature detector 8 from outer sides of the first substrate 4 and the second substrate 6 have approximately the same sizes as each other.

However, the first base material 2 and the second base material 3 can be provided to have a difference between sizes of the heat flux (for example, thermal conductivity [W/(m·K)]). In detail, in the temperature detecting element 1A, the thermal conductivity [W/(m·K)] of any one of the first base material 2 and the second base material 3, which faces the side where the temperature is to be detected, can be set to be greater than that of the other. Accordingly, a thermal transfer from the side where the temperature is to be detected to the temperature detector 8 is smoothly performed, and a thermal equilibrium between the side where the temperature is to be detected and the temperature detector 8 is rapidly obtained.

Meanwhile, in a case where the temperature detecting element 1A is attached to a product that is served through a low-temperature distribution (cold chain) as an example, the "side where the temperature is to be detected" may be a side of the temperature management environment, in which low temperature has to be maintained, or a side of the product that has to be maintained at low-temperature, according to the purpose of detection.

As a method of providing a difference between the thermal conductivities [W/(m·K)] of the first base material 2 and the second base material 3, for example, a method of selecting materials having different thermal conductivities [W/(m·K)] as materials for respectively forming the first substrate 4 and the second substrate 6, a method of selecting materials having different thermal conductivities [W/(m·K)] as materials for respectively forming the first electrode 5 and the second electrode 7, a method of changing thickness of each of the first substrate 4 and the second substrate 6, a method of changing thickness of each of the first electrode 5 and the second electrode 7, or a method of appropriately combining the above methods is used.

The partition wall 9 in the present embodiment is formed into a frame body arranged between the first electrode 5 and the second electrode 7, and the temperature detector 8 is arranged inside of the partition wall 9.

The partition wall 9 surrounds a periphery of the temperature detector 8 that is interposed between the first electrode 5 and the second electrode 7 so that the temperature detector 8 is isolated from outside air.

Examples of the material of the partition wall 9 include materials having electrical insulating property, and among them, resin materials such as polyethylene terephthalate (PET), polyethylene (PE), polycarbonate (PC), polyesters (PEs), polypropylene (PP), polyvinyl chloride (PVC), epoxy resin (EP), etc. are preferable. Such above resins may be any of thermoplastic resins, thermosetting resins, and photocurable resins. A material having a low thermal conductivity is preferably used as the material of the partition wall 9. In addition, the partition wall 9 can be arranged to form a geometric pattern or a pattern such as a predetermined character, a symbol, and a code (for example, QR code) in a plan view seen from a vertical direction with respect to the substrates 4 and 6. The partition wall 9 can be colored to have the same color tone as that of the temperature detector 8 in a color-developed state. The pattern formed by the partition wall 9 appears when the temperature detector 8 is not color-developed, and disappears the temperature detector 8 is color-developed.

(Temperature Detector)

Next, the temperature detector 8 will be described.

The temperature detector 8 of the present embodiment is configured as a chip that is interposed between the first electrode 5 and the second electrode 7 at a substantially center portion in a planar direction of each of the first base material 2 and the second base material 3.

The temperature detector 8 of the present embodiment is formed of a dielectric composition of high-resistance including a leuco dye, a developer, and a decolorizing agent that will be described below.

A color density of the temperature detector 8 changes based on color development and decolorizing of the leuco dye at a predetermined temperature, and along with the change in the color density, electrical properties such as a conductivity based on charge transfer and orientational polarization, and a dielectric constant (dielectric property) also change in the temperature detector 8.

The leuco dye is formed of an electron-donating compound, and examples thereof may include dyes used as a dye for pressure-sensitive copying paper and a dye for thermal recording paper, etc.

Examples of the leuco dye include a triphenylmethanephthalide-based dye, a fluoran-based dye, a phenothiazine-based dye, an indolylphthalide-based dye, a leucoauramine-based dye, a spiropyran-based dye, a rhodamine lactam-based dye, a triphenylmethane-based dye, a triazene-based dye, a spirophthalan xanthene-based dye, a naphtholactam-based dye, an azomethine-based dye, etc.

Specific examples of the leuco dye include, but are not limited to, 9-(N-ethyl-N-isopentylamino) spiro[benzo[a]xanthene-12,3'-phthalide], 2-methyl-6-(Np-tolyl-N-ethylamino) fluoran-6-(Diethylamino)-2-[(3-trifluoromethyl)anilino]xanthene-9-spiro-3'-phthalide, 3,3-bis(p-diethylaminophenyl)-6-dimethylaminophthalide, 2'-anilino-6'-(dibutylamino)-3'-methylspiro[phthalide-3,9'-xanthene], 3-(4-diethylamino-2-methylphenyl)-3-(1-ethyl-2-methylindol-3-yl)-4-azaphthalide, 1-ethyl-8-[N-ethyl-N-(4-methylphenyl) amino]-2,2,4-trimethyl-1,2-dihydrospiro[11H-chromeno[2,3-g]quinoline-11,3'-phthalide, etc.

One kind of the leuco dye can be used or two or more kinds of leuco dyes can be used in combination.

In addition, a color tone of the temperature detector 8 at the time of color development that will be described later can be adjusted by combining two or more kinds of leuco dyes.

The developer includes an electron acceptor, and is a compound performing color development of the leuco dye by bonding to the electron-donating leuco dye.

Examples of the developer include developers used as a developer for the pressure-sensitive copying paper and a developer for the thermal recording paper, etc.

Specific examples of the developer include, but are not limited to, phenols such as benzyl 4-hydroxybenzoate, 2,2'-biphenol, 1,1-bis(3-cyclohexyl-4-hydroxyphenyl) cyclohexane, 2,2-bis(3-cyclohexyl-4-hydroxyphenyl) propane, bisphenol A, bisphenol F, bis(4-hydroxyphenyl) sulfide, paraoxybenzoic acid ester, gallic acid ester, etc.; metal salts of carboxylic acid derivatives; salicylic acid and salicylic acid metal salts; sulfonic acids; sulfonic acid metal salts; phosphoric acids; phosphoric acid metal salts; acidic phosphoric acid esters; acidic phosphoric acid ester metal salts; phosphorous acids; phosphorous acid metal salts; etc.

The developer is preferably a developer highly compatible with the leuco dye and a decolorizing agent described below, and more preferably an organic developer such as 2,2'-biphenol, bisphenol A, gallic acid ester, etc.

One kind of the developer be used or two or more kinds of developers can be used in combination.

In addition, the color density of the temperature detector 8 at the time of color development can be adjusted by combining two or more developers.

A usage amount of the developer with respect to the leuco dye can be appropriately set according to the above-described color density, and, for example, can be set within a range from 0.1 parts by mass to 100 parts by mass with respect to 1 part by mass of the leuco dye.

The decolorizing agent is a compound dissociating the bond between the leuco dye and the developer, and controls a color-development initiation temperature and a decolorizing initiation temperature of the leuco dye.

Examples of the decolorizing agent include decolorizing agents used as a decolorizing agent for the pressure-sensitive copying paper, a decolorizing agent for the thermal recording paper, etc.

The decolorizing agent solidifies in a temperature range in which the color-developed state of the leuco dye is maintained, and is phase-separated from the leuco dye and the developer. In other words, the temperature detector 8 maintains the color-developed state as described later, by maintaining the bond between the leuco dye and the developer.

In addition, the decolorizing agent melts within a temperature range, in which the decolorized state of the leuco dye is maintained, and dissociates the bond between the leuco dye and the developer. In other words, the temperature detector 8 maintains the decolorized state as described later, by maintaining the dissociated state between the leuco dye and the developer.

That is, the temperature detector 8 starts color development when the decolorizing agent is at a freezing point or lower, and starts decolorizing when the decolorizing agent is at a melting point or lower.

The "color-developed state" of the temperature detector 8 in the present embodiment denotes a state, in which the color density of the temperature detector 8 is the highest. In addition, the "decolorized state" of the temperature detector 8 denotes a state, in which the color density of the temperature detector 8 is the lowest. Also, the color density can be expressed by lightness, from among hue, lightness, and saturation constituting color. Therefore, in a case where the color density is determined based on the color tone (tone), the color density is defined by the lightness between the lightness and the saturation constituting the color tone.

As the decolorizing agent according to the present embodiment, a decolorizing agent having a temperature difference between a freezing point and a melting point thereof is selected.

Specific examples of the decolorizing agent of the present embodiment include, but are not limited to, fatty acid ester compounds such as isopropyl myristate, isopropyl palmitate, tricaprylin, tricaprin, trilaurin, and trimyristin, and other esters, alcohols, ethers, ketones, amides, azomethines, fatty acids, hydrocarbons, etc. can be used.

One kind of the decolorizing agent can be used alone, but by using two or more kinds of decolorizing agents in combination, the freezing point and the melting point can be adjusted.

A usage amount of the decolorizing agent with respect to the leuco dye can be appropriately set according to the color density of the leuco dye, and, for example, can be set within a range from 1 part by mass to 800 parts by mass with respect to 1 part by mass of the leuco dye.

(First Other Aspect of Temperature Detector)

The temperature detector 8 may include a composition further including a conductive agent, in addition to the leuco dye, the developer, and the decolorizing agent. The conductive agent is preferably dissolved in the leuco dye, the developer, and the decolorizing agent. In addition, the conductive agent is preferably inert to other components of the temperature detecting element LA such as the partition wall 9, the electrodes 5 and 7, the base materials 4 and 6, etc.

The conductive agent is preferably dissolved in a predetermined solvent. In addition, it is also important that the conductive agent does not affect the color density of the temperature detector 8. As the conductive agent, a material having a salt structure or an ionic liquid is suitably used. It is preferable that a complex is used as the conductive agent.

Preferred examples of positive ions constituting the salt structure of the conductive agent include metal ions of Group 1 or 2 such as lithium, sodium, potassium, magnesium, calcium, etc., or a tetraalkyl ammonium ion. An alkyl chain of the tetraalkyl ammonium ion may have a linear or a branched shape, and a solubility thereof with respect to the solvent is improved as the number of carbon atoms increases. However, it is more preferable to have a smaller number of carbon atoms because the resistance can decrease at a small addition rate.

The number of carbon atoms in the alkyl chain of the tetraalkyl ammonium ion is preferably about 2 to 8.

As negative ions constituting the salt structure of the conductive agent, ions of inorganic acids such as nitrate ions and phosphate ions, or ions of organic acids such as hexafluorophosphate ions and tetrafluoroborate ions are preferable because the ions are highly soluble in the solvent.

Specific examples of the conductive agent include tetraethyl ammonium hexafluorophosphate, tetrapropyl ammonium hexafluorophosphate, tetrabutyl ammonium hexafluorophosphate, tetrapentyl ammonium hexafluorophosphate, tetrahexyl ammonium hexafluorophosphate, tetraoctyl ammonium hexafluorophosphate, tetraethyl ammonium tetrafluoroborate, tetrapropyl ammonium tetrafluoroborate, tetrabutyl ammonium tetrafluoroborate, tetrapentyl ammonium tetrafluoroborate, tetrahexyl ammonium tetrafluoroborate, tetraoctyl ammonium tetrafluoroborate, etc.

In addition, conductive solid fine particles of, for example, carbon, silver, etc. can also be used as the conductive agent. A particle diameter of the conductive solid fine particles is preferably 100 µm or less from a viewpoint of the visibility when the color density of the temperature detector 8 is determined, and is more preferably 1 µm or less from a viewpoint of dispersion stability of the conductive solid particles.

A content of the conductive agent in the temperature detector 8 is preferably 0.01% by mass to 20% by mass.

A resistivity (normal temperature) of the temperature detector 8 including the conductive agent in the above content can be set to be 10000 Ωcm or less and preferably 2000 Ωcm or less.

As a result, in the temperature detecting element 1A, the performance of detecting the resistance value of the temperature detector 8 is improved because the electric current flowing through the temperature detector 8 increases when a predetermined voltage is applied between the first electrode 5 and the second electrode 7, as described later.

(Second Other Aspect of Temperature Detector)

The temperature detector 8 may include a composition further including a non-color-developing material, in addition to the leuco dye, the developer, and the decolorizing agent. The composition may include the above-mentioned conductive agent.

FIG. 2(*a*) is a schematic diagram showing a status in which a non-color-developing material 24 retains a composition 25 including a leuco dye, a developer, and a decolorizing agent in the temperature detector 8 in a color-developed state. FIG. 2(*b*) is a schematic diagram showing a status in which the non-color-developing material 24 retains the composition 25 including the leuco dye, the developer, and the decolorizing agent in the temperature detector 8 in a decolorized state.

As shown in FIGS. 2(*a*) and 2(*b*), the non-color-developing material 24 is retained in a state in which the composition 25 including the leuco dye, the developer, and the decolorizing agent is dispersed. That is, the non-color-developing material 24 is a solid, and a phase formed of the composition 25 including the leuco dye, the developer, and the decolorizing agent is dispersed with respect to a phase formed of the non-color-developing material 24 to form a phase-separated structure, at the above-mentioned predetermined temperature. FIGS. 2(*a*) and 2(*b*) are diagrams schematically showing a state in which the composition 25 having an isotropic spherical shape is dispersed in the non-color-developing material 24, for example, as in a microcapsule or emulsion. In addition, in the temperature detector 8 including the composition 25 having an isotropic spherical shape, an interfacial layer may be provided between two phases of the phase formed of the composition 25 and the phase formed of the non-color-developing material 24, in order to prevent coalescence of the compositions 25 during manufacturing, retain the dispersed state, and have environment-resistance. In addition, the non-color-developing material 24 is used as a high viscosity liquid, for example, an interface layer is formed of a surfactant, a structure for retaining the temperature detector 8 may be provided as another example, but the present invention is not limited thereto.

FIGS. 2(*c*) and 2(*d*) are schematic diagrams showing a structure, in which the non-color-developing material 24 and the composition 25 are continuously separated in the temperature detector 8, wherein FIG. 2(*c*) shows the color-developed state of the temperature detector 8 and FIG. 2(*d*) shows the decolorized state of the temperature detector 8. The temperature detector 8 forms an anisotropic (amorphous) continuous phase formed of the composition 25 including the leuco dye, the developer, and the decolorizing agent, and non-color-developing material 24. The phase formed of the composition 25 including the leuco dye, the developer, and the decolorizing agent is anisotropically (amorphously) dispersed in the continuous phase formed of the non-color-developing material 24. The dispersed states shown in FIGS. 2(*c*) and 2(*d*) are likely to occur when a concentration ratio between the non-color-developing material 24 and the composition 25 is close to 1:1.

The non-color-developing material 24 (hereinafter, a reference sign 24 is omitted) does not include an electron acceptor unlike the developer, and does not show a color developing property with respect to the leuco dye when mixed with the leuco dye, the developer, and the decolorizing agent. In addition, the non-color-developing material does not impair the decolorability of the leuco dye due to the decolorizing agent.

Also, the melting point of the non-color-developing material is higher than the melting point of the composition 25 (mixture) including the leuco dye, the developer, and the decolorizing agent. The non-color-developing material in the solid state or the solidification state has a poor compatibility with each of the leuco dye, the developer, and the decolorizing agent.

As the non-color-developing material that satisfies the above conditions, a non-polar material only containing hydrocarbons is used.

Specific examples of the non-color-developing material include wax such as paraffin-based wax, microcrystalline-based wax, olefin-based wax, polypropylene-based wax, and polyethylene-based wax; polypropylene, polyethylene, polystyrene, cycloolefin, polysiloxane, copolymers thereof, etc.

A content of the non-color-developing material in the temperature detector 8 is set within a range from 30% by mass to 99% by mass. The content of the non-color-developing material in the temperature detector 8 is preferably from 40% by mass to 70% by mass, in consideration of a detection performance when a change in a color density and a change in a resistance value of the temperature detector 8, which will be described later, are detected.

According to the temperature detector 8 including the non-polar material, as shown in FIG. 2(*b*), even in a case where the decolorizing agent melts and the temperature detector 8 is in the decolorized state, the shape of the temperature detector 8 is more reliably retained. Accordingly, a structure in which the partition wall 9 (see FIG. 1) is omitted can be obtained, and a process of manufacturing the temperature detecting element 1A, which will be described below, can be further simplified.

(Method of Manufacturing Temperature Detecting Element)

Next, a method of manufacturing the temperature detecting element 1A will be described mainly with reference to FIG. 1.

In the manufacturing method according to the present embodiment, the first base material 2 and the second base material 3 are prepared first.

The first base material 2 is manufactured by forming the first electrode 5 on one surface of the first substrate 4. The second base material 3 is manufactured by forming the second electrode 7 on one surface of the second substrate 6.

Examples of the method of forming the first electrode 5 and the second electrode 7 include a well-known method such as a vacuum deposition method, a sputtering method, an ion-plating method, a photolithography method, etc.

Next, in the manufacturing method, the partition wall 9 is arranged on any one of the first base material 2 and the second base material 3. The partition wall 9 is formed on a side of the first electrode 5 of the first base material 2 or a side of the second electrode 7 of the second base material 3.

In the case where a resin film is used as a material of the partition wall 9, the partition wall 9 can be formed by bonding the resin film punched into a shape of the above frame body to any one of the first base materials and the second base material 3.

In the case where a resin composition including a monomer of a resin is used as the material of the partition wall 9, the partition wall 9 can be formed by applying the resin composition to anyone of the first base material 2 and the second base material 3 to have the shape of the frame body and then polymerizing the monomer. As a method of applying the resin composition, for example, a screen printing method, a dispenser printing method, etc. can be used.

In addition, in the case where a photocurable resin is used as the material of the partition wall 9, the partition wall 9 can be formed by a photolithography method. The shape of the frame body is not particularly limited, but may be a shape modelling a character or a predetermined figure, provided that a space for arranging the temperature detector 8 is provided therein.

Next, in the manufacturing method, the temperature detector 8 is formed by filling the inside of the partition wall 9 forming the frame body with a composition for forming a temperature detector.

The composition for forming a temperature detector is prepared by mixing the leuco dye, the developer, and the decolorizing agent. In the temperature detector 8 according to the above first aspect, the composition for forming a temperature detector is prepared by mixing the leuco dye, the developer, the decolorizing agent, and the conductive agent. In the temperature detector 8 according to the above second aspect, the composition for forming a temperature detector is prepared by mixing the leuco dye, the developer, the decolorizing agent, and the non-color-developing material.

The temperature detector 8 is formed by filling the inside of the partition wall 9 forming the frame body with a heated molten material of the composition for forming a temperature detector, and then cooling and solidifying the heated molten material.

In addition, the composition for forming a temperature detector may include an organic solvent.

Examples of the organic solvent include alcohols such as ethanol and methanol, methyl ethyl ketone (MEK), tetrahydrofuran (THF), toluene, 2-butanone, hexane, cyclohexane, heptane, etc.

Temperature detector 8 is formed by filling the inside of the partition wall 9 forming the frame body with the composition for forming a temperature detector which contains the organic solvent, and then volatilizing and drying the organic solvent.

Filling of the inside of the partition wall 9 with the composition for forming a temperature detector can be performed by using a printing method such as a dispenser printing method such as a one-drop filling (ODF), an inkjet printing method, a screen printing method, etc.

Next, in the manufacturing method, the partition wall 9 and the temperature detector 8 are interposed between any one of the first base material 2 and the second base material 3 and the other of the first base material 2 and the second base material 3. At this time, the other one of the first base material 2 and the second base material 3 is arranged so that the side of the first electrode 5 or the side of the second electrode 7 is in contact with the temperature detector 8. Then, the temperature detecting element 1A is completed by being pressurized from outside of the first base material 2 and the second base material 3 at a predetermined pressure, and by being heated as necessary.

In this manufacturing method, a thickness of the temperature detector 8 is determined according to a thickness of the partition wall 9.

However, the thickness of the temperature detector 8 can also be set by including spacer beads having a predetermined particle diameter in the composition for forming a temperature detector. Examples of the spacer beads include glass beads, resin beads, etc. that are chemically stable with respect to the composition for forming a temperature detector and have an insulating property. The spacer beads used for the temperature detector 8 having a light transmitting property are preferably transparent or semi-transparent spacer beads having a refractive index close to that of the temperature detector 8. When the above spacer beads are used, increase in haze and degradation in saturation due to scattering is suppressed, and thus a performance of detecting a light-absorbing property of the temperature detector 8 is improved.

The thickness of the temperature detector 8 according to the present embodiment is assumed to be from 1 μm to 3000 μm, and preferably from 4 μm to 1000 μm. The temperature detector 8 set to have the thickness as above has excellent performance of detecting an electromagnetic wave absorbing property such as the light-absorbing property and an electric property such as the conductivity, the dielectric constant (dielectric property), etc.

(Operation of Temperature Detecting Element)

Next, operations of the temperature detecting element 1A according to the present embodiment will be described. The operations of the temperature detecting element 1A will be described with an example, in which the temperature detecting element 1A is attached to a product (for example, frozen food, biopharmaceuticals, electronic components, etc.) served through a low-temperature distribution (cold chain).

The temperature detector 8 of the temperature detecting element 1A is thermally influenced from the outside (outer portion) of the first base material 2 and/or the second base material 3 under a temperature management environment in the low-temperature distribution (cold chain).

As described above, the light-absorbing property of the temperature detector 8 is changed based on the color development and decolorizing of the leuco dye at a predetermined temperature. A color-development initiation temperature of the leuco dye is dependent upon a freezing point of the decolorizing agent, and a decolorizing initiation temperature of the leuco dye is dependent upon a melting point of the decolorizing agent.

In addition, as described above, in the temperature detector 8, the electrical property such as the conductivity based on the charge transfer and orientational polarization, and the dielectric constant in the temperature detector 8 is changed, along with the change in the light-absorbing property. In detail, the resistance value of the temperature detector 8 of the present embodiment is changed so as to correspond to the change in the color density.

FIG. 3 is a graph showing a relationship between a temperature of the temperature detector 8 and the change in the color density and the resistance value of the temperature detector 8. FIG. 3 shows the temperature of the temperature detector 8 on a horizontal axis, shows the color density of the temperature detector 8 on a left vertical axis, and shows the resistance value of the temperature detector 8 on a right vertical axis. In FIG. 3, Ta denotes the melting point of the decolorizing agent, that is, the decolorizing initiation temperature of the temperature detector 8. Td denotes a freezing point of the decolorizing agent, that is, the color-development initiation temperature of the temperature detector 8. In FIG. 3, a reference sign A denotes a temperature management region in the low-temperature distribution (cold chain). A reference sign B in the temperature management region A denotes a temperature control region that is controlled to the temperature set in advance by a predetermined refrigeration cycle apparatus. A reference sign C in the temperature management region A denotes a cold-insulation temperature region that is allowed when the adiabatic cold-insulation is performed without using the refrigeration cycle apparatus in the low-temperature distribution (cold chain) process.

As shown in FIG. 3, the temperature detector 8 of the present embodiment shows color density hysteresis and resistance value hysteresis in response to the temperature change.

First, the color density hysteresis will be described.

When the temperature decreases from a state of P1, in which the decolorizing agent melts and the leuco dye and the developer are dissociated, the temperature detector 8 maintains the decolorized state until reaching the freezing point Td of the decolorizing agent (color-development initiation temperature). In other words, the color density of the temperature detector 8 maintains the lightest color.

In FIG. 3, a state of the temperature detector 8 that has reached the freezing point Td of the decolorizing agent in the decolorized state is referred to as P2.

Next, when the temperature of the temperature detector 8 in the state of P2 is equal to or lower than the freezing point Td of the decolorizing agent, the decolorizing agent starts to solidify and is separated from the leuco dye and the developer. That is, when the leuco dye and the developer start to bond to each other, the temperature detector 8 starts to develop color.

When the temperature of the temperature detector 8 is further decreased, the color density of the temperature detector 8 increases due to further progress of the separation caused by the solidification and crystallization of the decolorizing agent, and the bond between the leuco dye and the developer.

After that, when the temperature of the temperature detector 8 further decreases, an increase rate of the color density becomes slow, and the temperature falls beyond a predetermined temperature Ts1. As a result, the color density does not increase and becomes a saturation state. That is, the bond of the leuco dye and the developer is completed when the decolorizing agent is completely solidified and separated. Accordingly, the color density of the temperature detector 8 shows the darkest color.

Hereinafter, Ts1 is referred to as a first saturation temperature. In FIG. 3, a state of the temperature detector 8 that has reached the first saturation temperature Ts1 is referred to as P3. When the temperature detector 8 reaches the first saturation temperature Ts1 and becomes the state of P3, the color-developed state is maintained with the darkest color even when the temperature detector 8 reaches a state of P4 at the temperature lower than the first saturation temperature Ts1.

On the other hand, when the temperature rises from the state of P4, at which the decolorizing agent is solidified and the leuco dye and the developer are bonded to each other, the temperature detector 8 maintains the color-developed state until the melting point Ta of the decolorizing agent (decolorizing initiation temperature). That is, the temperature detector 8 in the state of P4 maintains the color density thereof at the darkest color without returning to the state of P2 from the state of P3 (without decolorizing).

In FIG. 3, the state of the temperature detector 8 that has reached the melting point Ta of the decolorizing agent in the color-developed state is referred to as P5.

Next, when the temperature of the temperature detector 8 in the state of P5 becomes equal to or higher than the melting point Ta of the decolorizing agent, the decolorizing agent starts to melt and the leuco dye and the developer are dissociated. That is, the bond between the leuco dye and the developer is loosened, and the temperature detector 8 starts to decolorize.

When the temperature of the temperature detector 8 further rises, the color density of the temperature detector 8 is reduced due to the further progress of the dissociation between the leuco dye and the developer.

After that, when the temperature of the temperature detector 8 further rises, a decrease rate of the color density becomes slow, and when the temperature exceeds a predetermined temperature Ts2, the color density does not decrease and becomes the saturation state. That is, the dissociation of the leuco dye and the developer is completed when the decolorizing agent completely melts. Accordingly, the color density of the temperature detector 8 shows the lightest color.

Hereinafter, Ts2 is referred to as a second saturation temperature. In FIG. 3, a state of the temperature detector 8 that has reached the second saturation temperature Ts2 is referred to as P6.

When the temperature detector 8 reaches the second saturation temperature Ts2 and becomes the state of P6, the decolorized state is maintained with the lightest color even when the temperature detector 8 reaches a state of P1 at the temperature higher than the second saturation temperature Ts2.

The temperature detector 8 in the state of P1 does not return to the state of P5 from the state of P6 (without developing color) when the temperature detector decreases, and the color density of the temperature detector 8 maintains the lightest color until reaching the freezing point Td of the decolorizing agent, as described above.

That is, the relationship between the temperature and the color density of the temperature detector 8 forms a hysteresis loop passing through the states of P2, P3, P5, and P6.

Next, the resistance value hysteresis will be described.

In the temperature detector 8, the decolorizing agent melts or solidifies corresponding to the change in the color density, as described above. In addition, the leuco dye and the developer are dissociated or are bonded to each other, in correspondence with the melting or solidifying of the decolorizing agent. Such melting and solidifying of the decolorizing agent, and the dissociation and bond of the leuco dye and the developer bring out a change in the resistance value of the temperature detector 8.

Specifically, as shown in FIG. 3, when the temperature decreases from the state of P1, in which the decolorizing agent melts and the leuco dye and the developer are dissociated, the temperature detector 8 maintains a first resistance value that is the lowest until reaching the freezing point Td of the decolorizing agent.

Then, when the temperature of the temperature detector 8 is equal to or lower than the freezing point Td, the temperature detector 8 gradually increases the resistance value.

When the temperature of the temperature detector 8 reaches the first saturation temperature Ts1, the temperature detector 8 maintains a second resistance value even in a case of being the state of P4, in which the temperature is lower than the first saturation temperature Ts1.

In addition, when the temperature rises from the state of P4, in which the decolorizing agent completely solidifies and the bond of the leuco dye and the developer are completed, the temperature detector 8 maintains the second resistance value until reaching the melting point Ta of the decolorizing agent (the state of P5).

Then, when the temperature of the temperature detector 8 in the state of P5 is equal to or higher than the melting point Ta, the temperature detector 8 gradually reduces the resistance.

When the temperature of the temperature detector 8 reaches the second saturation temperature Ts2 (the state of P6) and the temperature detector 8 has the lowest first resistance value, the temperature detector 8 maintains the first resistance value even in a case of being the state of P1, in which the temperature is higher than the second saturation temperature Ts2.

The temperature detector 8 in the state of P1 does not return to the state of P5 from the state of P6 (without increasing the resistance) when the temperature detector decreases, and the temperature detector 8 maintains the first resistance value until reaching the freezing point Td of the decolorizing agent, as described above.

That is, the relationship between the temperature and the resistance value of the temperature detector 8 forms a hysteresis loop passing through the states of P2, P3, P5, and P6. Particularly, when the above ionic conductive agent is added to the temperature detector 8, an ion conductivity of the temperature detector 8 is significantly different between the solid state and the liquid state, and thus the change in the resistance value increases due to the state change and the detectability is improved.

Next, an initialization of the temperature detecting element 1A will be described.

The temperature detector 8 forming the hysteresis loop is initialized before the temperature detecting element 1A is attached to a predetermined product.

In this initialization, the temperature detector 8 is set to be in the color-developed state. Examples of the temperature detector 8 in the color-developed state include a temperature detector set to be a temperature lower than the first saturation temperature Ts1, and a temperature detector set in the state from the state of P3 to the state of P5.

Examples of the initialization method of the temperature detector 8 include a method including a process of cooling the temperature detector 8 to at least a predetermined temperature lower than the first saturation temperature Ts1. As a result, the temperature detector 8 is initialized to the color-developed state, for example, as the state of P4. In addition, examples of the initialization method for achieving the color-developed state from the state of P3 to the state of P5 include a method including the process of cooling the temperature detector 8 to the predetermined temperature lower than the first saturation temperature Ts1 and a process of heating the temperature detector 8 to a predetermined temperature exceeding the first saturation temperature Ts1 after the process.

Specifically, for example, when the temperature detector 8 in the decolorized state indicated by R in FIG. 3 is cooled to a predetermined temperature lower than the first saturation temperature Ts1, the temperature detector 8 becomes the color-developed state indicated by P4, as described above. Next, when the temperature detector 8 is heated to a predetermined temperature exceeding the first saturation temperature Ts1, the temperature detector 8 is initialized and becomes a state of S.

Before performing the initialization process, the initialization process can be omitted for the temperature detector 8 that is already in the color-developed state.

In addition, the initialization of the temperature detecting element 1A can be performed by heating the temperature detector 8 to be the decolorized state, contrary to the above initialization according to the cooling. examples of the temperature detector 8 that is initialized by being heated include a temperature detector set to a temperature higher than the second saturation temperature Ts2, and a temperature detector set in the state from the state of P6 to the state of P2. The temperature detector 8 initialized as above maintains the first resistance value.

The temperature detecting element 1A can be applied to one used in a temperature management region that is higher than the room temperature (warm storage of products), as described later. According to the temperature detecting element 1A, a temperature history of whether or not the product has been lower than the predetermined management temperature can be detected by determining whether or not the temperature detector 8 changes from the decolorized state to the color-developed state.

(Temperature History of Temperature Detecting Element)

The temperature detecting element 1A shares the same temperature history as a product, by being attached to the product that is served through the low-temperature distribution (cold chain), as described above. That is, by detecting whether or not the temperature of the temperature detecting element 1A is appropriately managed within a temperature range of a temperature management region A (see FIG. 3), whether or not the temperature of the product is managed within the temperature range of the temperature management region A is indirectly detected.

An upper limit temperature of the temperature management region A is a temperature, at which the temperature of the product is not exceeded, and is equal to the second saturation temperature Ts2 in the present embodiment. The second saturation temperature Ts2 can be adjusted by the kind of the decolorizing agent of the temperature detector 8 or a combination ratio of two or more kinds thereof, and the decolorizing agent of the temperature detector 8 is prepared in correspondence with the temperature that does not exceed the temperature of the product.

In addition, a lower limit temperature Tc1 and an upper limit temperature Tc2 of a temperature control region B, in which the temperature is controlled to a temperature set in advance by a predetermined refrigeration cycle apparatus, can be set to satisfy a relational expression of Td<Tc1<Tc2<Ta (where Td and Ta are the freezing point and the melting point of the decolorizing agent mentioned above). However, the lower limit temperature Tc1 and the upper limit temperature Tc2 of the temperature control region B are not particularly limited, provided that those temperatures are lower than the second saturation temperature Ts2.

When a product to which the temperature detecting element 1A is attached is served through the low-temperature distribution (cold chain), the product is controlled to a temperature that is equal to or higher than Tc1 and equal to or lower than the upper limit temperature Tc2 by a predetermined refrigeration cycle apparatus (see temperature control region B). Also, the product may be separated from the refrigeration cycle apparatus and may be served through the low-temperature distribution (cold chain) by cold-insulation using, for example, a cooler box. At this time, the product may be cold-insulated at the temperature exceeding Tc2 (see cold-insulation temperature region C). Otherwise, the product may be in the cold-insulated state due to a temporary failure of the refrigeration cycle apparatus.

Then, when the temperature management is performed again by the refrigeration cycle apparatus from the cold-insulated state, the product is controlled to the temperature that is equal to or higher than Tc1 and equal to or lower than the upper limit temperature Tc2.

Here, it is assumed that the temperature of the product in the cold-insulated state is controlled to be equal to or higher than Tc1 and equal to or lower than the upper limit temperature Tc2 again by the refrigeration cycle apparatus, without exceeding the second saturation temperature Ts2 of the upper limit temperature in the temperature management region A. In this case, the temperature detector 8 of the temperature detecting element 1A, which shares the same temperature history as the product, maintains the color-developed state according to the hysteresis returning to the state of P5 described above.

Regarding this, it is assumed that the temperature of the product in the cold-insulated state is controlled to be equal to or higher than Tc1 and equal to or lower than the upper limit temperature Tc2 again by the refrigeration cycle apparatus, after exceeding the second saturation temperature Ts2 of the upper limit temperature in the temperature management region A. In this case, the temperature detector 8 of the temperature detecting element 1A, which shares the same temperature history as the product, maintains the decolorized state according to the hysteresis proceeding to the state of P2 without returning to the state of P5 described above.

Therefore, by determining whether the temperature detector 8 is in the color-developed state or in the decolorized state, the temperature history of whether or not the temperature of the product exceeds the upper limit temperature of the temperature management region A is detected.

In detail, in a case where the temperature detector 8 is determined to be in the decolorized state, it is determined that the temperature of the temperature detector 8 exceeds the upper limit of the temperature of the cold-insulation temperature region C. In a case where the temperature detector 8 is determined to be in the color-developed state, it is determined that the temperature of the temperature detector 8 does not exceed the upper limit of the temperature of the cold-insulation temperature region C.

In addition, the temperature history of the product is detected by determining whether the resistance value of the temperature detector 8 is in a state of the first resistance value or in a state of the second resistance value.

In detail, in a case where the resistance value of the temperature detector 8 is determined to be the first resistance value, it can be determined that the temperature of the temperature detector 8 exceeds the upper limit of the temperature of the cold-insulation temperature region C. In a case where the resistance value of the temperature detector 8 is determined to be the second resistance value, it can be determined that the temperature of the temperature detector 8 does not exceed the upper limit of the temperature of the cold-insulation temperature region C.

(Temperature Detecting Apparatus)

Next, a temperature detecting apparatus 10 including the temperature detecting element 1A according to the present embodiment will be described.

FIG. 4 is an explanatory diagram showing a configuration of the temperature detecting apparatus 10.

As shown in FIG. 4, the temperature detecting apparatus 10 includes a temperature history detecting mechanism 11 for detecting a temperature history of the temperature detector 8 in the temperature detecting element 1A.

The temperature history detecting mechanism 11 includes an electrical property evaluation unit 12, an optical property evaluation unit 13, a signal processing circuit 14, and an output unit 23.

The electrical property evaluation unit 12 determines and evaluates whether or not the temperature detector 8 of the temperature detecting element 1A becomes a temperature exceeding the upper limit temperature of the temperature management region A (the second saturation temperature Ts2), based on an electric signal (electric current value) output from the temperature detecting element 1A.

The electrical property evaluation unit 12 includes a power source circuit 18. The power source circuit 18 generates an output power that is required from an electric power input from a power source 15. The power source circuit 18 in the present embodiment applies a predetermined voltage between the first electrode 5 and the second electrode 7 of the temperature detecting element 1A. In detail, the power source circuit 18 applies a predetermined voltage set within a range from 0.01 V to 1000 V between the first electrode 5 and the second electrode 7.

In addition, the resistance value of the temperature detector 8 is calculated based on a value of the electric current flowing through the temperature detector 8.

Although a voltage waveform in the present embodiment is assumed to be a direct current waveform, the voltage waveform may be an alternating current waveform. When the voltage waveform is the alternating current waveform, by setting the voltage waveform into a certain wavelength band, changes in a capacity and a dielectric constant related to dielectric polarization such as orientational polarization due to orientation operation of a polar group, etc. of the temperature detector 8 mentioned above from impedance and a phase angle or charge transfer, and ionic polarization due to the charges such as ions can be accurately detected.

In the temperature detecting apparatus 10 in the present embodiment, it is assumed that each of the electrodes 5 and 7 of the temperature detecting element 1A and the electrical property evaluation unit 12 are connected to each other by a predetermined wiring via an interconnection element 19 at an end portion of the temperature detecting element 1A. An electric current value of the temperature detector 8 is output through the interconnection element 19.

Examples of the interconnection element 19 include conductive rubber (rubber connector), flexible printed circuit (FPC), tape carrier package (TCP), conductive tape, etc.

It is assumed that the connection between the interconnection element 19 and each of the electrodes 5 and 7 and the connection between the interconnection element 19 and the electrical property evaluation unit 12 according to the present embodiment are performed by adhering, for example, a metal paste, an anisotropic conductive paste, an anisotropic conductive film (ACF), etc. by a conductive adhesive.

However, the temperature detecting element 1A and the temperature history detecting mechanism 11 can be configured to be detachably connected to each other. According to the above configuration, for example, in a case where a plurality of temperature detecting elements 1A attached respectively to a plurality of products are accessed via one temperature history detecting mechanism 11, attaching/detaching manipulations between the temperature detecting element 1A and the temperature history detecting mechanism 11 can be simplified.

Examples of the configuration of detachably connecting the temperature detecting element LA and the temperature history detecting mechanism 11 to each other include a connection via a fixing tool such as a clip, a connection via a modular jack and a connector, etc.

In addition, the connection of the temperature detecting element 1A and the electrical property evaluation unit 12 is not shown in the drawings, but the components can be wirelessly connected to each other. Examples of the wireless connection include a radio frequency identifier (RFID) that exchanges information by wireless communication using an electromagnetic induction method, a radio wave method, etc. from a radio frequency (RF) tag in which ID information is embedded. The frequency band that is used is not particularly limited, but it is preferable to use a frequency band capable of obtaining a high transmission effect in consideration of the influence of electromagnetic waves generated from peripheral electronic devices and moisture in the specification environment. A tag antenna that is to be attached to a side of the temperature detecting element 1A is preferably a thin film coil having an excellent light transmitting property and thermal conductivity.

Since the temperature detecting element 1A can be managed in a non-contact manner according to the wireless connection between the temperature detecting element 1A and the electrical property evaluation unit 12, the mobility of the product to which the temperature detecting element 1A is attached is excellent, and accessibility to the temperature detecting element 1A and workability of the temperature detection are also improved.

The optical property evaluation unit 13 outputs the change in the color density of the temperature detector 8 as a change in a light-absorbing property (electromagnetic wave absorbing property) of the temperature detector 8. That is, the optical property evaluation unit 13 determines whether the temperature detector 8 is in the decolorized state or in the color-developed state based on an intensity of transmitted light or reflected light of the temperature detector 8. Accordingly, the optical property evaluation unit 13 determines and evaluates whether or not the temperature of the temperature detector 8 exceeds the upper limit temperature (second saturation temperature Ts2) of the temperature management region A.

The optical property evaluation unit 13 includes a light source 20 irradiating the temperature detector 8 with light, and a photodetector 21.

The light source 20 is not particularly limited, provided that the light source can radiate visible light, ultraviolet ray, infrared ray, etc. Specific examples thereof include a light-emitting diode such as an inorganic LED and an organic LED (OLED), a halogen lamp, a deuterium lamp, laser, etc. The light radiated from the light source 20 is preferably white light. In addition, it is possible to use light only having a wavelength range (for example, monochromatic light), in which an absorption spectrum largely changes between the color-developed state and the decolorized state of the temperature detector 8.

The photodetector 21 detects and outputs the intensity of the light radiated from the light source 20 to the temperature detector 8 and transmitted or reflected by the temperature detector 8. That is, the photodetector 21 configures an optical system of a transmission densitometer (ISO5/2 standard) or a reflection densitometer (ISO5/4 standard) of light.

Examples of the photodetector 21 include a charge-coupled device (CCD) camera, a photomultiplier tube (PMT), a photodiode, etc.

The signal processing circuit 14 includes a central processing unit (CPU), various memories, etc. The signal processing circuit 14 acquires the resistance value of the temperature detector 8 based on a signal output through the interconnection element 19 from the temperature detecting element 1A, and stores the resistance value in a memory. In addition, the signal processing circuit 14 acquires the intensity of the transmitted light or reflected light of the temperature detector 8, which is output from the photodetector 21, and stores the intensity in the memory.

In addition, the signal processing circuit 14 determines whether the acquired resistance value of the temperature detector 8 is the first resistance value or the second resistance value mentioned above, by comparing a predetermined resistance threshold stored in the memory in advance with the acquired resistance value of the temperature detector 8.

In a case where the resistance value of the temperature detector 8 is determined as the first resistance value, the signal processing circuit 14 determines and evaluates that the temperature of the temperature detector 8 exceeds the upper limit temperature (second saturation temperature Ts2) of the temperature management region A. The signal processing circuit 14 outputs a command for turning on, for example, an alarm lamp included in the output unit 23, to the output unit 23, based on the determination and evaluation.

In addition, in a case where the resistance value of the temperature detector 8 is determined as the second resistance value, the signal processing circuit 14 determines and evaluates that the temperature of the temperature detector 8 does not exceed the upper limit temperature (second saturation temperature Ts2) of the temperature management region A. The signal processing circuit 14 outputs a command for maintaining, for example, an alarm lamp included in the output unit 23 in an 'off' state, to the output unit 23, based on the determination and evaluation.

In addition, the signal processing circuit 14 determines whether the temperature detector 8 is in the color-developed state or in the decolorized state, by comparing a predetermined light intensity stored in the memory in advance with the acquired intensity of the transmitted light or the reflected light of the temperature detector 8.

In a case where the temperature detector 8 is determined to be in the decolorized state, the signal processing circuit 14 determines and evaluates that the temperature of the temperature detector 8 exceeds the upper limit temperature (second saturation temperature Ts2) of the temperature management region A. The signal processing circuit 14 outputs a command for turning on, for example, the alarm lamp included in the output unit 23, to the output unit 23, based on the determination and evaluation.

In a case where the temperature detector 8 is determined to be in the color-developed state, the signal processing circuit 14 determines and evaluates that the temperature of the temperature detector 8 does not exceed the upper limit temperature (second saturation temperature Ts2) of the temperature management region A. The signal processing circuit 14 outputs a command for maintaining, for example, an alarm lamp included in the output unit in an 'off' state, to the output unit 23, based on the determination and evaluation.

The output unit 23 displays a result of evaluating whether or not the temperature detector 8 exceeds the upper limit temperature (second saturation temperature Ts2) of the temperature management region A, in response to the command from the signal processing circuit 14. Although the output unit 23 of the present embodiment is assumed to have the alarm lamp that indicates the determination and evaluation in on/off states, the output unit 23 may include a liquid crystal monitor capable of displaying characters, figures, symbols, etc. Also, the liquid crystal monitor can display external environment information of the temperature detecting apparatus 10 such as humidity, time, and location thereof, input to the signal processing circuit 14 via an external input device (not shown), individual information of the product to which the temperature detecting element 1A is attached, character information indicating predetermined conditions such as a management condition, barcodes, QR codes, etc.

In addition, the output unit 23 can remotely perform integrated management of information output from the temperature detecting apparatus 10 by cooperating with an external device such as a computer (not shown) through a wire or wirelessly.

Also, the temperature detecting apparatus 10 in the present embodiment is assumed to include both the electrical property evaluation unit 12 and the optical property evaluation unit 13, but may include any one of the electrical property evaluation unit 12 and the optical property evaluation unit 13.

In addition, the temperature detecting apparatus 10 in the present embodiment determines and evaluates the temperature detector 8 based on the transmitted light or reflected light at the time of irradiating the temperature detector 8 with light from the light source 20, but the determination and evaluation can be performed by using ambient light such as sunlight or room lighting, without using the light source 20.

The temperature detecting apparatus 10 in the present embodiment performs determination and evaluation of the temperature detector 8 based on the intensity of light output from the photodetector 21, but the determination and evaluation can be visually performed without using the photodetector 21. At this time, an illuminance around the temperature detector 8 is preferably 10 Lx or greater, and more preferably 30 Lx or greater, taking into account the visibility.

In the temperature detecting apparatus 10 of the present embodiment, the interconnection element 19 and the temperature history detecting mechanism 11 are separately provided, but when the interconnection element 19 is a flexible printed circuit, each electric circuit mounted on the temperature history detecting mechanism 11 can be mounted on the flexible printed circuit.

The temperature detecting apparatus 10 of the present embodiment may further include a failure self-diagnosis device (not shown) that inputs failure information signals regarding an unexpected failure, etc. to the signal processing circuit 14.

The photodetector 21 of the temperature detecting apparatus 10 according to the present embodiment is assumed to detect only the intensity of the transmitted light or the reflected light at the time of irradiating the temperature detector 8, but can detect an illuminance, etc. of the external environment of the temperature detecting apparatus 10. The illuminance, etc. of the external environment of the temperature detecting apparatus 10, which is detected by the photodetector 21, can be used as a calibration at the time of detecting the intensity of the transmitted light or the reflected light from the temperature detector 8.

(Operational Effects of Temperature Detecting Element and Temperature Detecting Apparatus)

Next, operational effects of the temperature detecting element 1A and the temperature detecting apparatus 10 according to the present embodiment will be described.

As described above, in the temperature detecting element of the related art (for example, see PTL 1), when it is determined whether or not the temperature of the product served through the low-temperature distribution (cold chain) exceeds an upper limit of the management temperature, the determination is performed based on an irreversible change of the temperature detecting element. Therefore, the temperature detecting element of the related art needs to be stored sufficiently below the upper limit of the management temperature before use.

Therefore, the temperature detecting element of the related art has a problem of complicating the storage management of the temperature detecting element before use.

On the other hand, even when the temperature detecting element 1A according to the present embodiment is stored at the temperature higher than the upper limit of the management temperature, initialization may be performed due to the above-mentioned hysteresis loop indicated by the temperature detector 8. Therefore, according to the temperature detecting element 1A, the storage management before use is easily performed.

In addition, even when the temperature detecting element of the related art (for example, see PTL 1) is stored under the temperature management below the predetermined temperature, if there is a difference in given temperature history like temperature detecting elements, for example, belonging to different lots, a variation in the initial state of the temperature detecting element in use occurs. Therefore, the temperature detecting element of the related art may not accurately detect temperature changes in the temperature management environment.

On the other hand, the temperature detecting element 1A according to the present embodiment can be initialized according to the hysteresis loop indicated by the temperature detector 8. Therefore, a variation in the initial states of a plurality of temperature detecting elements 1A can be reduced. Accordingly, the temperature detecting element 1A can accurately detect the temperature change in the temperature management environment, as compared with the temperature detecting element of the related art (for example, see PTL 1).

In addition, in a case of the temperature detecting element that reversibly changes corresponding to the temperature change in the temperature management environment, even when a product is exposed to a temperature exceeding the upper limit of the management temperature, the temperature history is cancelled when the temperature returns to the temperature management range again after that. That is, the change in the temperature environment to which the product is exposed cannot be detected.

Regarding this, the temperature detecting element 1A according to the present embodiment can accurately detect the change in the temperature environment, to which the product is exposed, without cancelling the temperature history of the product, due to the above-mentioned hysteresis loop indicated by the temperature detector 8.

In addition, since the temperature detecting element 1A of the present embodiment includes the temperature detector 8, in which both of the electromagnetic wave absorbing property (light-absorbing property) and the electrical property (conductivity, dielectric constant (dielectric property), etc.) are reversibly changed, reliability of verifying the temperature history of the product is improved.

Since the temperature detecting element 1A according to the present embodiment has a simple structure including the temperature detector 8 that includes the leuco dye, the developer, and the decolorizing agent, the manufacturing processes can be simplified and manufacturing costs can be reduced.

Also, in the temperature detecting element LA according to the present embodiment, since the temperature detector 8 is arranged and protected between the first base material 2 and the second base material 3, the temperature detector 8 can be prevented from being damaged by contact with other members.

According to the temperature detector 8 of the temperature detecting element 1A of the present embodiment, the decolorizing of the temperature detector 8 starts at the temperature equal to or higher than the melting point Ta of the decolorizing agent included in the temperature detector 8 and the color development starts at the temperature equal to or lower than the freezing point Td of the decolorizing agent. Therefore, the temperature change of the temperature detector 8 is clearly shown as a color tone change (color density change) of the temperature detector 8, according to the temperature detecting element 1A. Accordingly, the temperature detecting element 1A has an excellent temperature detecting performance.

The temperature detecting element 1A according to the present embodiment has a configuration, in which a thermal conductivity of any one of the first base material 2 and the second base material 3 is greater than that of the other. In detail, in the temperature detecting element 1A, any one of the first base material 2 and the second base material 3, which faces the side where the temperature is to be detected, may be set to have a thermal conductivity [W/(m·k)] that is greater than that of the other.

According to the temperature detecting element 1A, a thermal transfer from the side where the temperature is to be detected to the temperature detector 8 can be smoothly performed, and a thermal equilibrium between the side where the temperature is to be detected and the temperature detector 8 can be rapidly obtained.

In the temperature detecting element 1A according to the present embodiment, the upper limit temperature of the temperature management region A of the product (see FIG. 3) can be finely adjusted by adjusting the melting point Ta of the decolorizing agent included in the temperature detector 8.

The temperature detecting apparatus 10 according to the present embodiment has operational effects that are the same as the above-mentioned operational effects of the temperature detecting element 1A, and further has following operational effects.

In the temperature detecting apparatus 10 according to the present embodiment, the temperature history detecting mechanism 11 quantitatively determines whether or not the temperature of the temperature detector 8 in the temperature detecting element 1A exceeds the upper limit temperature of the temperature management region A of the product (see FIG. 3) based on the light intensity and/or the resistance value output by the temperature detector 8. Therefore, according to the temperature detecting apparatus 10, whether or not the temperature of the product exceeds the upper limit temperature of the temperature management region A (see FIG. 3) can be accurately determined.

Also, in the temperature detecting apparatus 10 in which the temperature history detecting mechanism 11 wirelessly detects the temperature history of the temperature detector 8, since the temperature detecting element can be managed in a non-contact manner, mobility of the product to which the temperature detecting element 1A is attached is excellent, and accessibility to the temperature detecting element 1A and the workability of the temperature detection is improved.

The embodiments of the present invention are described above, but the present invention is not limited to the above embodiments and can be implemented in various forms. In the other embodiments (modified examples), components that are the same as those of the above embodiment will be denoted by the same reference signs and detailed descriptions thereof will be omitted.

FIG. 5 is an explanatory diagram showing a configuration of a temperature detecting element 1B according to a first modified example.

As shown in FIG. 5, the temperature detecting element 1B is different from the temperature detecting element 1A of the above embodiment (see FIG. 1) in that the first electrode 5 is not formed on the first substrate 4 and the first electrode 5 and the second electrode 7 are formed side by side on the second substrate 6. That is, the first electrode 5 and the second electrode 7 are formed on a side of a second base material 3A.

The temperature detector 8 arranged to electrically contact the first electrode 5 and the second electrode 7 on the second substrate 6 is arranged in the partition wall 9 formed into the frame body.

The temperature detector 8 is arranged between the first substrate 4 and the second substrate 6. A gap 26 is formed between the temperature detector 8 and the first substrate 4.

The temperature detecting element 1B is used so that the side of the second substrate 6 is thermally connected to a predetermined product 27 and the side of the first substrate 4 is exposed to a temperature management space 28 of the product 27.

According to the temperature detecting element 1B, the thermal transfer from the side of the temperature management space 28 to the temperature detector 8 via the first substrate 4 is suppressed due to a heat insulation effect of the gap 26, and the thermal transfer from the side of the product 27 to the temperature detector 8 via the second substrate 6 is performed with priority. Therefore, in the temperature detecting element 1B, the temperature detector 8 is not affected by the rapid temperature change of the temperature management space 28, and the temperature detection of the product 27 can be performed stably.

FIG. 6 is an explanatory diagram showing a configuration of a temperature detecting element 1C according to a second modified example.

As shown in FIG. 6, in the temperature detecting element 1C, a plurality of temperature detectors 8 are arranged so that the partition wall 9 is formed on the second substrate 6 into a grid shape and each grid formed in the partition wall 9 is filled. Therefore, the first electrode 5 and the second electrode 7 are formed on the second substrate 6 so as to respectively correspond to the temperature detectors 8. That is, the first electrode 5 and the second electrode 7 are arranged side by side for each of the temperature detectors 8.

The temperature detecting element 1C, similar to the temperature detecting element 1B, is used so that the side of the second substrate 6 having the gap 26 is thermally connected to the predetermined product 27 and the side of the first substrate 4 is exposed to the temperature management space 28 of the product 27.

In the temperature detecting element 1C, the plurality of temperature detectors 8 are configured to respectively have second saturation temperatures Ts2 (see FIG. 3) that are different from one another. The second saturation temperature Ts2 of each of the temperature detectors 8 is set to be distributed at predetermined temperature intervals above and below the upper limit temperature across the upper limit temperature of the temperature management region A (see FIG. 3) of the product 27.

According to the temperature detecting element 1C as above, when the temperature of the product 27 exceeds the upper limit temperature of the temperature management region A, it is possible to detect how much the product 27 heated up by specifying the temperature detector 8 having the highest second saturation temperature Ts2 from among the temperature detectors 8 in the decolorized state.

In the temperature detecting elements 1B and 1C, although not shown, the first substrate 4 can be omitted. In the temperature detecting elements 1B and 1C, the manufacturing processes can be simplified by omitting the first substrate 4, and the manufacturing costs can be reduced.

Figure 7A:
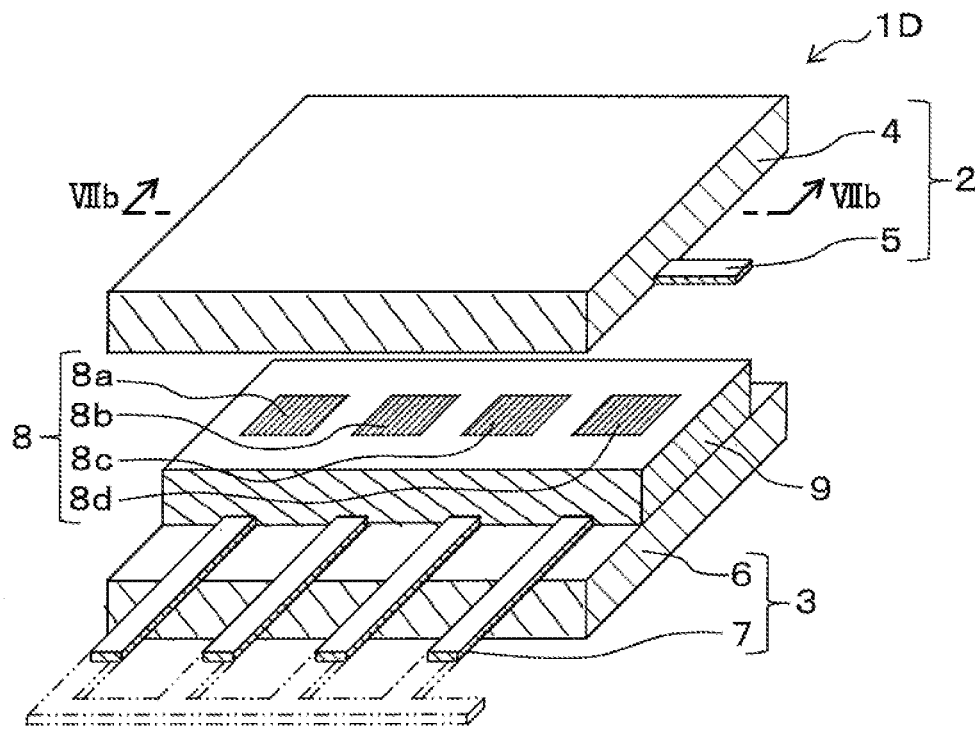
FIG. 7A is a partially exploded perspective view of a temperature detecting element according to a third modified example.
Figure 7B:
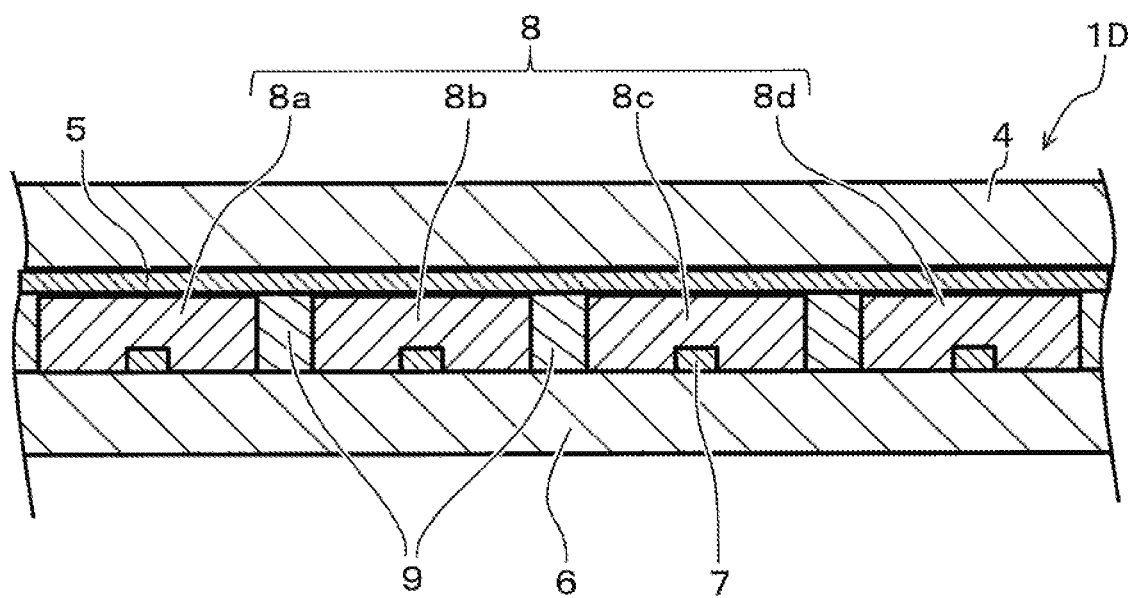
FIG. 7B is a cross-sectional view taken along line VIIb-VIIb in FIG. 7A.

FIG. 7(a) is a partially exploded perspective view of a temperature detecting element 1D according to a third modified example. FIG. 7(a) shows the first substrate 4 and the first electrode 5 separated from the temperature detector 8. FIG. 7(b) is a cross-sectional view of a portion taken along a line VIIb-VIIb of FIG. 7(a).

As shown in FIGS. 7(a) and 7(b), the temperature detecting element 1D includes a plurality of temperature detectors 8 respectively connected to each other in parallel via the first electrode 5 and the second electrode 7 arranged on the second substrate 6. In the temperature detecting element 1D, the number of the temperature detectors 8 is set to be m (m is an integer of 5 or greater), but in FIGS. 7(a) and 7(b), only four (8a, 8b, 8c, and 8d) temperature detectors are shown from among m temperature detectors (8a, 8b, 8c, 8d, for convenience of drawing.

The first electrode 5 extends in a left-to-right direction on a plane of FIGS. 7(a) and 7(b), and is electrically connected to all of the m temperature detectors (8a, 8b, 8c, 8d, ...).

The second electrode 7 is a comb-shaped electrode having m branches corresponding to m temperature detectors 8 (8a, 8b, 8c, 8d, ...). Each branch of the comb-shaped electrode is electrically connected to each of the m temperature detectors 8 (8a, 8b, 8c, 8d, ...).

In FIGS. 7(a) and 7(b), reference sign 2 denotes the first base material, reference sign 3 denotes the second base material, reference sign 4 denotes the first substrate, reference sign 6 denotes the second substrate, and reference sign 9 denotes the partition wall.

According to the temperature detecting element 1D, a combined resistance value Rx between the electrodes 5 and 7 in each of m temperature detectors 8 is $1/(1/R_1+1/R_2+1/R_3+1/R_4+ \ldots 1/Rm)$. Each of $R_1$ to Rm denotes each resistance value in the m temperature detectors 8 (8a, 8b, 8c, 8d, ...).

Also, among the temperature detectors 8, the temperature detector 8 in the color-developed state indicates the second resistance value (see FIG. 3), and the temperature detector 8 in the decolorized state indicates the first resistance value (see FIG. 3).

Meanwhile, in the temperature detecting element 1D that is initialized, all of the m temperature detectors 8 (8a, 8b, 8c, 8d, ...) indicate the second resistance value (see FIG. 3).

Assuming that the temperature of the product 27 (see FIG. 5) to which the temperature detecting element 1D is attached exceeds the upper limit temperature of the temperature management region A (see FIG. 3), from among the m temperature detectors 8 (8a, 8b, 8c, 8d, ...), only the temperature detector 8 having the second saturation temperature Ts2 (see FIG. 3) that is lower than the upper limit temperature of the temperature management region A is in the decolorized state. That is, the resistance value of the temperature detector 8 in the decolorized state is changed from the second resistance value in the color-developed state to the first resistance value in the decolorized state.

According to the temperature detecting element 1D, a map in which the temperature change is associated with the change in the combined resistance value Rx is prepared in advance, and the temperature corresponding to the actual combined resistance value Rx based on the detected electric current is obtained from the map. Therefore, it is possible to detect how many degrees (° C.) of the product 27 (see FIG. 5) have been risen.

According to the temperature detecting element 1D, the number of electrodes can be reduced and the temperature detectors 8 can be mounted with high density. In the temperature detecting element 1D, an electrode area of the second electrode 7 in each partition wall 9 can be increased. Accordingly, a contact area between the temperature detector 8 and the second electrode 7 in each partition wall 9 increases, and a measurement sensitivity of the electrical property of the temperature detector 8 is further improved. Also, the electric connection of the second electrodes 7 inside and outside each partition wall 9 is easily performed, an interval between the second electrodes 7 on the outer portion of each partition wall 9 is increased, and thus crosstalk can be reliably prevented.

It is assumed that the temperature detecting elements 1A, 1B, 1C, and 1D as described above are used in the temperature management region A that is lower than the room temperature (cold storage of product), but the temperature detecting elements can be applied to a case of the utilization in the temperature management region that is higher than the room temperature (warm storage of product).

REFERENCE SIGNS LIST

1A: temperature detecting element
1B: temperature detecting element
1C: temperature detecting element
1D: temperature detecting element
2: first base material (base material)
3: second base material (base material)
4: first substrate (substrate)
5: first electrode (electrode)
6: second substrate (substrate)
7: second electrode (electrode)
8: temperature detector
8a: temperature detector
8b: temperature detector
8c: temperature detector
8d: temperature detector
9: partition wall
10: temperature detecting apparatus
11: temperature history detecting mechanism
12: electrical property evaluation unit
13: optical property evaluation unit
14: signal processing circuit
15: power source
18: power source circuit
19: interconnection element
20: light source
21: photodetector
23: output unit
24: non-color-developing material 25: composition
0: developer
A: temperature management region
B: temperature control region
C: cold-insulation temperature region
Td: freezing point
Ta: melting point

The invention claimed is:

1. A temperature detecting element comprising:
a first base material including a first substrate and a first electrode arranged on the first substrate; and
a first temperature detector arranged on the first substrate and electrically in contact with the first electrode,
wherein the first temperature detector exhibits a reversible change in an electromagnetic wave absorbing property and in an electrical property corresponding to a temperature change of the first temperature detector; and
wherein the first temperature detector includes a leuco dye, a developer, and a decolorizing agent.

2. The temperature detecting element according to claim 1, wherein the first temperature detector is configured to start decolorizing at a temperature that is equal to or higher than a melting point of the decolorizing agent included in the first temperature detector, and is configured to start color development at a temperature that is equal to or lower than a freezing point of the decolorizing agent.

3. The temperature detecting element according to claim 1, wherein the first temperature detector further includes a conductive agent.

4. The temperature detecting element according to claim 1,
wherein the first temperature detector further includes a non-color-developing material, and
the non-color-developing material is solid at a predetermined temperature, and a phase containing the leuco dye, the developer, and the decolorizing agent is configured to form a phase-separation structure that is dispersed with respect to a phase formed of the non-color-developing material at the predetermined temperature.

5. The temperature detecting element according to claim 4, wherein the melting point of the non-color-developing material is higher than a melting point of a mixture including the leuco dye, the developer, and the decolorizing agent included in the first temperature detector.

6. The temperature detecting element according to claim 1, wherein the electrical property is conductivity or dielectric properties.

7. The temperature detecting element according to claim 1, further comprising:
a second base material facing the first base material, the second base material being different from the first base material,
wherein the first temperature detector is arranged between the first base material and the second base material, and
a gap is formed between the first temperature detector and the second base material.

8. The temperature detecting element according to claim 1,
wherein the first base material and a second base material are arranged so as to interpose the temperature detector therebetween, and
wherein a thermal conductivity of any one of the first base material and the second base material is greater than a thermal conductivity of the other.

9. A temperature detecting apparatus comprising:
the temperature detecting element according to claim 1; and
a temperature history detecting mechanism for detecting a temperature history of the first temperature detector in the temperature detecting element.

10. The temperature detecting apparatus according to claim 9, wherein the temperature history detecting mechanism includes an output unit for outputting the detected temperature history.

11. The temperature detecting apparatus according to claim 9, wherein the temperature history detecting mechanism measures at least any one of the electromagnetic wave absorbing property and the electrical property of the first temperature detector.

12. A temperature detecting element comprising:
a first base material including a first substrate and a first plurality of electrodes and a plurality of second electrodes arranged on the first substrate;
a plurality of second temperature detectors which correspond respectively to the plurality of second electrodes and are arranged to electrically contact the second electrodes,
wherein the first temperature detector exhibits a reversible change in an electromagnetic wave absorbing property and in an electrical property corresponding to a temperature change of the first temperature detector; and
wherein the first temperature detector includes a leuco dye, a developer, and a decolorizing agent.

13. The temperature detecting element according to claim 12, wherein the plurality of first and second temperature detectors are connected in parallel with one another via the first and second electrodes arranged on the substrate.

* * * * *